United States Patent
Fix et al.

(10) Patent No.: US 12,398,894 B2
(45) Date of Patent: Aug. 26, 2025

(54) VAPOR-SELECTIVE NANOSTRUCTURED MEMBRANE HEAT EXCHANGERS FOR COOLING AND DEHUMIDIFICATION

(71) Applicant: Purdue Research Foundation, West Lafayette, IN (US)

(72) Inventors: Andrew Joseph Fix, West Lafayette, IN (US); James Edward Braun, West Lafayette, IN (US); David Martin Warsinger, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 619 days.

(21) Appl. No.: 17/795,709

(22) PCT Filed: Feb. 24, 2021

(86) PCT No.: PCT/US2021/019314
§ 371 (c)(1),
(2) Date: Jul. 27, 2022

(87) PCT Pub. No.: WO2021/173600
PCT Pub. Date: Sep. 2, 2021

(65) Prior Publication Data
US 2023/0243525 A1 Aug. 3, 2023

Related U.S. Application Data

(60) Provisional application No. 62/980,991, filed on Feb. 24, 2020.

(51) Int. Cl.
*F24F 3/147* (2006.01)
*B01D 53/26* (2006.01)
(Continued)

(52) U.S. Cl.
CPC .......... *F24F 3/147* (2013.01); *B01D 53/268* (2013.01); *B01D 69/108* (2022.08); *B01D 71/80* (2013.01);
(Continued)

(58) Field of Classification Search
CPC .............. F24F 3/147; F24F 2003/1435; B01D 69/108; B01D 2257/80; B01D 53/268;
(Continued)

(56) References Cited

U.S. PATENT DOCUMENTS 6,438,964 B1    8/2002  Gibtin
6,672,099 B1 *  1/2004  Yoshimi .................. F25B 19/00
                                                      62/467
(Continued)

FOREIGN PATENT DOCUMENTS

EP    3031512    6/2016
EP    3043887    10/2018
(Continued)

OTHER PUBLICATIONS

Akhtar et al., Pebax®1657/Graphene oxide composite membranes for improved water vapor separation. Journal of Membrane Science, 525, 187-194, 2017.
(Continued)

*Primary Examiner* — Robert Clemente
(74) *Attorney, Agent, or Firm* — Piroozi-IP, LLC

(57) ABSTRACT

A heat exchange system is disclosed which includes an air inlet, a membrane in fluid communication with the air inlet and adapted to have a partial vapor pressure difference across the membrane to thereby drive water vapor flux through the membrane, wherein the membrane is a selective membrane configured to allow passage of water vapor and block passage of air ($O_2/N_2$) through the membrane, where the membrane includes a thermally conductive side, a vacuum pump configured to generate the partial vapor pressure difference across the membrane, and a heat exchanger coupled to the thermally conductive side of the membrane configured to provide simultaneous mass and heat transfer.

16 Claims, 16 Drawing Sheets

(51) Int. Cl.
- B01D 69/10 (2006.01)
- B01D 71/80 (2006.01)
- F24F 3/14 (2006.01)
- F28D 21/00 (2006.01)
- F28F 21/02 (2006.01)
- F28F 21/06 (2006.01)

(52) U.S. Cl.
CPC .......... *F28D 21/0015* (2013.01); *F28F 21/02* (2013.01); *F28F 21/067* (2013.01); *B01D 2257/80* (2013.01); *F24F 2003/1435* (2013.01); *F24F 2003/1458* (2013.01)

(58) Field of Classification Search
CPC ..... F28D 21/0015; F28F 21/06; F28F 21/067; F28F 21/02
See application file for complete search history.

(56) References Cited

U.S. PATENT DOCUMENTS

| | | | |
|---|---|---|---|
| 7,131,288 | B2 | 11/2006 | Toonen et al. |
| 2005/0072303 | A1* | 4/2005 | Weidenmann ....... B01D 53/268 96/4 |
| 2006/0096750 | A1 | 5/2006 | Meuzelaar |
| 2010/0018393 | A1* | 1/2010 | Weidmann .............. F24F 3/147 95/52 |
| 2014/0157985 | A1 | 6/2014 | Scovazzo et al. |

FOREIGN PATENT DOCUMENTS

| | | |
|---|---|---|
| JP | 6352915 | 7/2018 |
| JP | 6845919 | 3/2021 |

OTHER PUBLICATIONS

Bui et al., Effect of hygroscopic materials on water vapor permeation and dehumidification performance of poly(vinyl alcohol) membranes. Journal of Applied Polymer Science, 134, 44765, 2017.
Bui et al., A thermodynamic perspective to study energy performance of vacuum-based membrane dehumidification. Energy, 132, 106-115, 2017.
Claridge et al., A new approach for drying moist air: The ideal Claridge-Culp-Liu dehumidification process with membrane separation, vacuum compression and sub-atmospheric condensation. International Journal of Refrigeration, 101, 211-217, 2019.
Labban et al., Next-generation HVAC: Prospects for and limitations of desiccant and membrane-based dehumidification and cooling. Applied Energy, 200, 330-346, 2017.
Scovazzo et al., Membrane module design, construction, and testing for vacuum sweep dehumidification (VSD): Part I, prototype, development and module design. Journal of Membrane Science, 576, 96-107, 2019.
Woods, Membrane processes for heating, ventilation, and air conditioning. Renewable and Sustainable Energy Reviews, 33, 290-304, 2014.
Bukshaisha et al., Simulation of membrane heat pump system performance for space cooling, Int. J. Refrig., vol. 99, pp. 371-381, 2019.
Claridge et al., A Performance analysis of the Claridge-Culp-Liu dehumidification process: A novel approach for drying moist air based on membrane separation, vacuum compression and sub-atmospheric condensation, Int. J. Refrig., vol. 122, pp. 192-200, 2021.
Bynum et al., Thermodynamic Modeling of a Membrane Dehumidification System, Texas A&M University, 2012.
Armatis et al., Evaluation of governing heat and mass transfer resistance in membrane-based energy recovery ventilators with internal support structures, Sci. Technol. Built Environ., vol. 23, pp. 912-922, 2017.
Mahmud et al., Performance testing of a counter-cross-flow run-around membrane energy exchanger (RAMEE) system for HVAC applications, Energy and Buildings, vol. 42, No. 7. pp. 1139-1147, 2010.
Scovazzo, Membrane module design, constructions, and testing for vacuum sweep dehumidification (VSD): Part II, prototype performance vs variations in feed conditions, J. Memb. Sci., vol. 611, p. 118391, 2020.
Bynum et al., Energy performance analysis of a membrane dehumidification system, International Journal of Refrigeration, 127, 230-238, 2021.
Chandrasekaran et al., Optimizing Combined Membrane Dehumidification With Heat Exchangers Using CFD for High Efficiency HVAC Systems, Thesis Purdue University 2020.
ISR Reference of PCT/US2021/019314, 2021.

\* cited by examiner

VAPOR-SELECTIVE NANOSTRUCTURED MEMBRANE HEAT EXCHANGERS FOR COOLING AND DEHUMIDIFICATION

CROSS-REFERENCE TO RELATED APPLICATIONS

The present patent application is a 35 U.S.C. § 371 Nationalization Application of and claims the priority benefit of the International Patent Application Serial No. PCT/US21/19314 filed Feb. 24, 2021, which is related to and claims the priority benefit of U.S. Provisional Patent Application Serial No. 62/980,991, filed Feb. 24, 2020, the contents of each of which are hereby incorporated by reference in its entirety into the present disclosure.

STATEMENT REGARDING GOVERNMENT FUNDING

This invention was not made with Government Support.

TECHNICAL FIELD

The present disclosure generally relates to heat transfer technologies, and in particular, to membrane-type heat exchanger.

BACKGROUND

This section introduces aspects that may help facilitate a better understanding of the disclosure. Accordingly, these statements are to be read in this light and are not to be understood as admissions about what is or is not prior art.

For decades, vapor compression cooling systems' two dominant energy losses have long been assumed inevitable: large temperature gradients (sensible) and heat loss from condensation (latent). Innovation to improve heat transfer has focused on solid materials in heat exchangers and flow paths, but is approaching maturation. One such alternative technology is based on membrane dehumidifiers. In general, a vacuum membrane dehumidification unit operates with a moist air flow on one side of the membrane, and a vacuum pressure on the other side of the membrane. With the membrane being made a material that allows water vapor to pass through, but not air, this vacuum pressure essentially pulls the water vapor out of the air stream. Membrane dehumidification relies on a partial vapor pressure difference across the membrane to drive water vapor flux through the membrane. However, further improvement in efficiencies of these systems are needed.

Therefore, there is an unmet need for a novel dehumidification approach that improves efficiencies as compared to the existing technologies.

SUMMARY

A heat exchange system is disclosed. The system includes an air inlet, a membrane in fluid communication with the air inlet and adapted to have a partial vapor pressure difference across the membrane to thereby drive water vapor flux through the membrane, wherein the membrane is a selective membrane configured to allow passage of water vapor and block passage of air ($O_2/N_2$) through the membrane, where the membrane includes a thermally conductive side, a vacuum pump configured to generate the partial vapor pressure difference across the membrane, and a heat exchanger coupled to the thermally conductive side of the membrane configured to provide simultaneous mass and heat transfer.

The heat exchange system according to one embodiment the membrane includes an active layer and a support layer.

The heat exchange system according to one embodiment the support layer includes a graphene foam layer.

The heat exchange system according to one embodiment the support layer includes one or more of copper foam, aluminum foam, copper mesh, and aluminum mesh.

The heat exchange system according to one embodiment the active layer includes a polymeric material.

The heat exchange system according to one embodiment the polymeric material includes one or more of Pebax 1657/GO, Pebax MV 1074, PVA/TiO2, PVA/LiCl, and PVA/TEG.

The heat exchange system according to one embodiment the support layer includes a ceramic material.

The heat exchange system according to one embodiment the ceramic material includes silicon carbide.

An air conditioning system is also disclosed which includes a vapor-selective membrane adapted to have a partial vapor pressure difference across the membrane to thereby drive water vapor flux through the membrane, wherein the membrane is a selective membrane configured to allow passage of water vapor and block passage of air ($O_2/N_2$) through the membrane, a vacuum compressor adapted to provide dehumidification and vapor compression, and cooling coils incorporated with the vapor-selective membrane to thereby allow simultaneous cooling and dehumidification.

The air conditioning system according to one embodiment the vapor-selective membrane includes an active layer and a support layer.

The air conditioning system according to one embodiment the support layer includes a graphene foam layer.

The air conditioning system according to one embodiment the support layer includes one or more of copper foam, aluminum foam, copper mesh, and aluminum mesh.

The air conditioning system according to one embodiment the active layer includes a polymeric material.

The air conditioning system according to one embodiment the polymeric material includes one or more of Pebax 1657/GO, Pebax MV 1074, PVA/TiO2, PVA/LiCl, and PVA/TEG.

The air conditioning system according to one embodiment the support layer includes a ceramic material.

The air conditioning system according to one embodiment the ceramic material includes silicon carbide.

Another air conditioning system is disclosed which includes a first membrane module. The first membrane module includes an inlet and an outlet, at least one vapor-selective membrane, and a first plurality of cooling coils coupled to the at least one vapor selective membrane of the first membrane module. The first membrane module defines a first vacuum zone. The system further includes a second membrane module. The second membrane module includes an inlet and an outlet, at least one vapor-selective membrane, and a second plurality of heating coils coupled to the at least one vapor selective membrane of the second membrane module. The second membrane module defines a second vacuum zone. The system further includes an air inlet adapted to introduce outdoor air into the inlet of the first membrane module, a primary vacuum pump adapted to initially reduce pressure in the first and the second vacuum zones to a predetermined pressure or below, and an outlet coupled to the outlet of the second module and adapted to output air to the outdoor air. The pressure in the first vacuum zone is modulated based on water vapor partial pressure in air passing through the inlet of the first membrane module and the pressure in the second vacuum zone is modulated based on water vapor partial pressure in air passing through the inlet of the second membrane module, whereby the pressure in the second vacuum zone is maintained at a higher pressure than the pressure in the first vacuum zone.

The air conditioning system according to one embodiment the at least one vapor-selective membrane of the first and the second membrane modules includes an active layer and a support layer.

The air conditioning system according to one embodiment the support layer includes a graphene foam layer.

The air conditioning system according to one embodiment the support layer includes one or more of copper foam, aluminum foam, copper mesh, and aluminum mesh.

The air conditioning system according to one embodiment the active layer includes a polymeric material.

The air conditioning system according to one embodiment the polymeric material includes one or more of Pebax 1657/GO, Pebax MV 1074, PVA/TiO2, PVA/LiCl, and PVA/TEG.

The air conditioning system according to one embodiment the support layer includes a ceramic material.

The air conditioning system according to one embodiment the ceramic material includes silicon carbide.

The air conditioning system according to one embodiment the at least one vapor-selective membrane of the first membrane module is adapted to have a partial vapor pressure difference across the membrane to thereby drive water vapor flux through the membrane, wherein the membrane is a selective membrane configured to allow passage of water vapor and block passage of air ($O_2/N_2$) through the membrane.

The air conditioning system according to one embodiment the at least one vapor-selective membrane of the second membrane module is adapted to have a partial vapor pressure difference across the membrane to thereby drive water vapor flux through the membrane, wherein the membrane is a selective membrane configured to allow passage of water vapor and block passage of air ($O_2/N_2$) through the membrane.

The air conditioning system according to one embodiment the pressure modulation in the first and the second vacuum zones is performed by a secondary pump.

The air conditioning system according to one embodiment the pressure modulation in the first and the second vacuum zones is performed by a water vapor compressor.

The air conditioning system according to one embodiment further comprising a first divider disposed between the first membrane module and the second membrane module, wherein the pressure modulation in the first and the second vacuum zones is accomplished by thermal gradients across the first divider through a first valve.

The air conditioning system according to one embodiment further comprising a second divider having a second valve disposed between the first divider and the second membrane module, thereby generating an accumulator zone between the first divider and the second divider, whereby the first valve and the second valve are selectively operated when a predetermined amount of water vapor is accumulated in the accumulator zone to thereby release the water vapor to the second membrane module.

DETAILED DESCRIPTION

Figure 1:
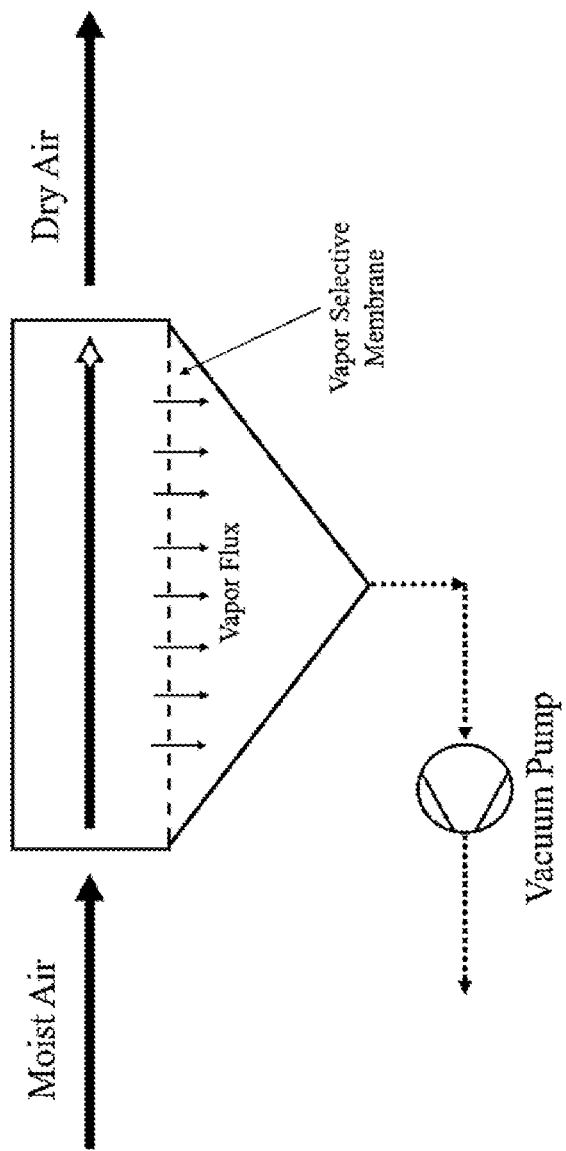
FIG. 1 is a schematic depiction of a general membrane dehumidification process.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

FIG. 1 presents a basic depiction of a membrane dehumidification process. Moist air enters the module on a first side, and a vacuum compressor creates a near-vacuum pressure on a second side of the membrane. This low pressure on the second side of the membrane essentially pulls water vapor through the membrane (and a small amount of air). So, in a sense, vapor selective membranes act as somewhat of a filter.

Two major membrane characteristics that govern membrane dehumidification are permeability and selectivity. Permeability is often expressed in terms of $$\frac{m^3(STP)}{m^2 * Pa * s},$$

which is essentially the volume of gas passed through the membrane for a given membrane area, pressure difference and time period. Selectivity is expressed as a ratio of the amount of gas that you want to pass through divided by the amount of gas you do not want to pass through the membrane. So in membrane dehumidification, a selectivity of 80,000 would indicate that for every 80,000 moles of water vapor that pass through the membrane, one mole of air ($N_2/O_2$) will also pass through.

Ultimately, membrane dehumidification is driven by the partial vapor pressure difference across the membrane and is described by the following equation $$J = \text{Permeability} * \text{Area} * (P_{vap\ high} - P_{vap\ low})$$

Where J is the water vapor flux across the membrane and P represents vapor partial pressures.

Permeability and selectivity are complex functions of porosity, material properties, fabrication techniques, etc. The membrane technology of the present disclosure provides improved efficiency for dehumidification both through a novel system design as well as proposed new materials.

Figure 2:
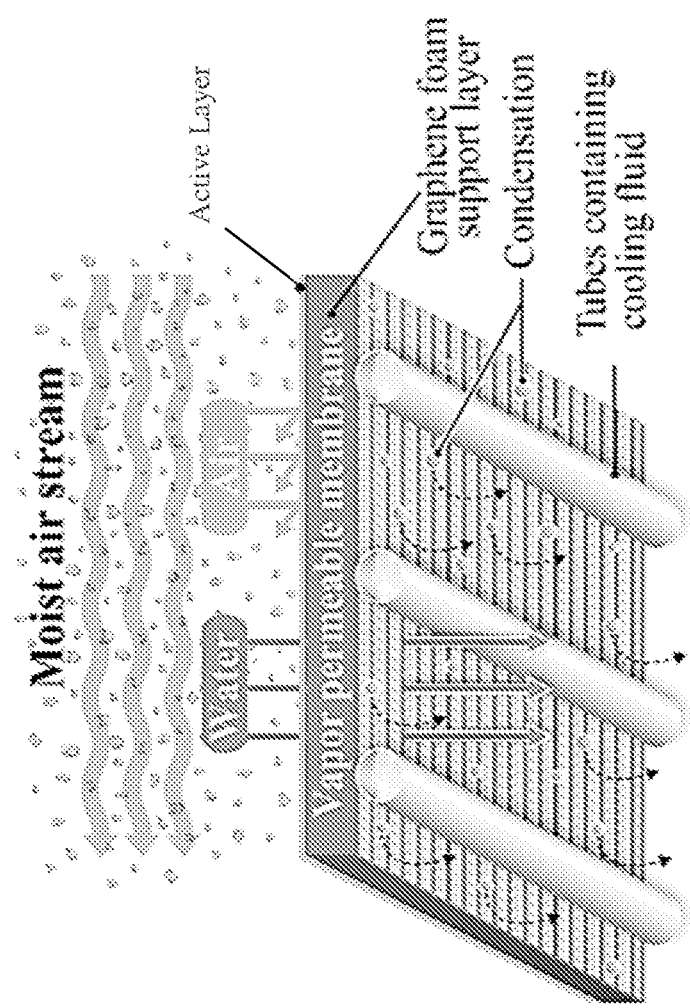
FIG. 2 is a schematic of the membrane dehumidification technology according to the present disclosure.

Towards this end, the present disclosure describes a hybrid of vapor-selective ($O_2/N_2$ blocking) membranes with an integrated heat exchanger to dramatically improve dehumidification and heat transfer efficiency. Referring to FIG. 2, a schematic of the membrane dehumidification technology according to the present disclosure is provided, hereafter called membrane-HX (or alternatively membrane-HX system). Here, selective membranes that pass vapor but not air can have a thermally conductive backside for simultaneous mass and heat transfer. This integration of thermal conductivity with vapor selectivity is expected to enhance efficiency in at least one way: Integrating heat exchange and selective membranes can enable a new heat pipe-type effect to move vapor through the selective membrane without a vacuum pump, thus reducing the overall work input requirement under certain conditions, while maintaining benefits of membrane technology of the prior art listed as: 1) reduction of the standard evaporator-condenser ΔT (for coupled sensible and latent cooling) from e.g., about 15°-20° C. to about 6°-10° C. (for the separated sensible cooling), as efficiency is proportional to $T_c/\Delta T$. This benefit, while not specifically related to thermally conductive membrane embodiment of the present disclosure, is attained because such heat exchange systems operate with large temperature differences to induce condensation dehumidification; however, since no condensation is needed in various embodiments of the present disclosure, large temperature differences are not needed, thus resulting in an efficiency improvement as well in the embodiments of the present disclosure. 2) The membrane allows for removing humidity as exhaust, avoiding condensation and much of the latent load entirely. 3) Finally additional benefits can be realized such as use of waste heat, higher cooling cycle efficiency, and water collection, again not specific to the thermally conductive membrane. A membrane-HX can vary temperature at separation, and thus improving on other membrane systems since separation least energy (work) is a strong function of humidity (and thus temperature). 4) Furthermore, the arrangement shown in FIG. 2 reduces size and weight, and is exceptionally suited for extreme/humid conditions, and the decoupling of sensible and latent loads enhances demand response and part-load capabilities. While the cooling coils are shown on the inside (i.e., on the bottom side of the thermally conductive membrane), the cooling coils can also be on the outside of the membrane (i.e., above the membrane), which in fact establishes the central embodiment of the present disclosure. According to this central embodiment, air comes in direct contact with the cooling surfaces of the cooling pipes. The configuration shown in FIG. 2, however, allows the heat of the outdoor air to be conducted through the membrane to the cooling channels that are touching or integrated into the membrane on the bottom. The cooling channels being in the vacuum side (i.e., the inside or the bottom side) can also enable a "heat pipe" effect known to a person having ordinary skill in the art.

In order to better understand the benefit of the membrane-HX system of the present disclosure, it is important to understand the long established technology, as well as the recent emerging technologies. First, standard vapor-compression cooling systems will be described and evaluated, followed by a recent membrane cooling system, and concluding with the membrane-HX system of the present disclosure with membrane heat exchanger and its varying configurations.

Membrane dehumidification, since its inception, has been defined as an isothermal (constant temperature) process. However, there can be several advantages for energy savings if a system operates such that it simultaneously dehumidifies and cools air (thus a non-isothermal membrane dehumidification device).

Figure 3:
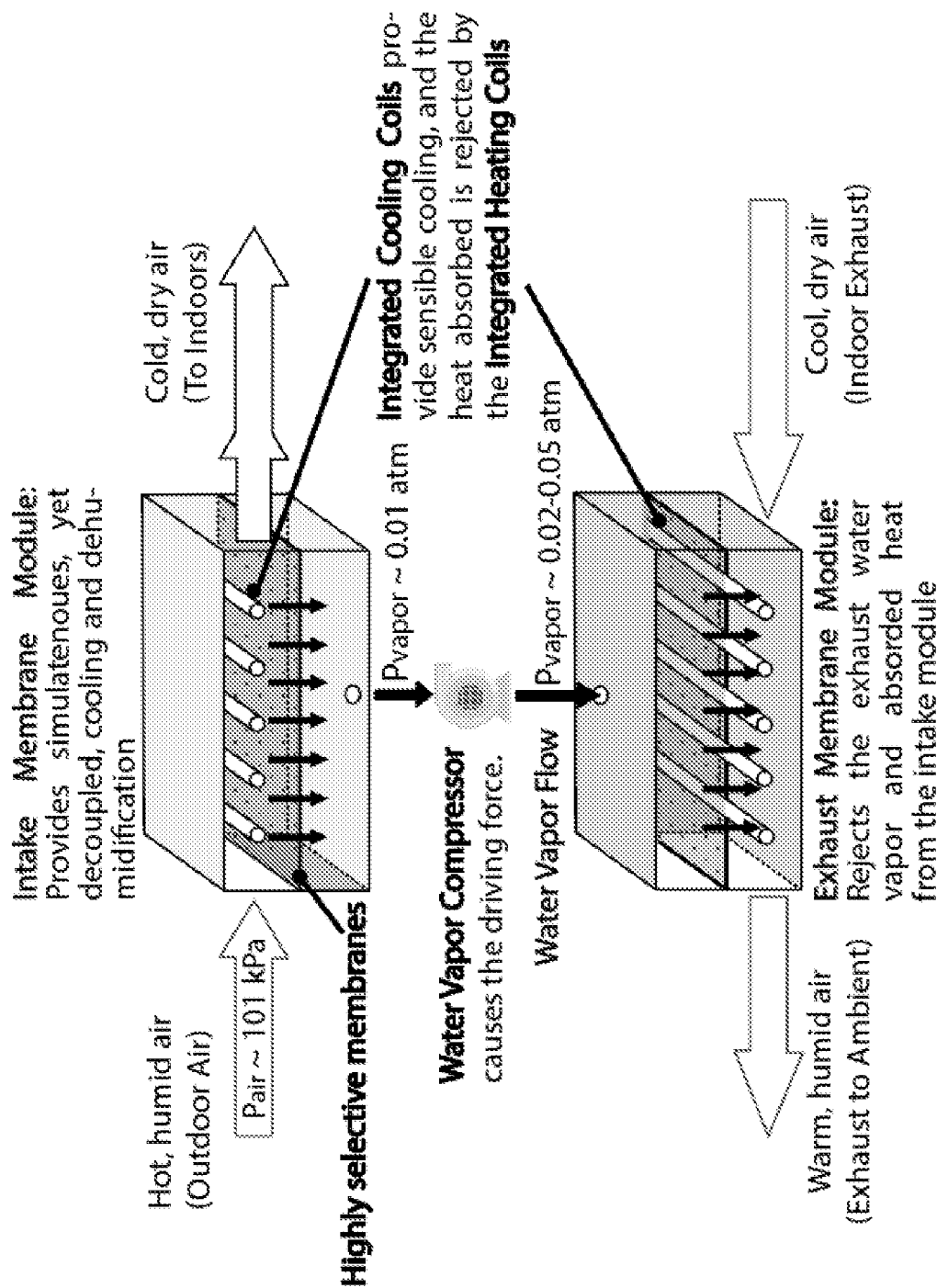
FIG. 3 is a basic conceptual schematic of the membrane-HX system according to the present disclosure.

A basic conceptual schematic of the membrane-HX system of the present disclosure is presented in FIG. 3. The membrane-HX system of the present disclosure consolidates the membrane dehumidification, cooling, and selective heating processes of the prior art in a novel arrangement (i.e., the membrane-HX system of the present disclosure). This consolidation relies on a few key components not seen in any of the base systems singularly. First, according to one embodiment, the membranes are thermally conductive, however, non-thermally conductive membranes are also within the ambit of the present disclosure. This is a property that is not sought out in related membrane technologies, giving rise to a first novel aspect of this technology. Second, the cooling and heating coils are integrated into the membrane module—as discussed above, the coils can and be placed on the inside of the membrane, i.e., below the membrane, as shown in FIG. 2; or as discussed above, according to the central embodiments of the present disclosure on the outside, i.e., above the membrane—contacting the thermally conductive membranes. This aspect again represents another novel feature of the membrane-HX system of the present disclosure in that in prior art designs, cooling and heating of the air stream occurred separately from dehumidification. However, controlling the temperature at separation can allow for more efficient dehumidification and thus more efficient system performance.

Several additional advantages may also arise from such a configuration. First, the theoretical minimum amount of energy required to separate water vapor from air is a strong function of temperature and humidity, thus cooling the air while dehumidifying can allow for dehumidification to occur closer to the optimal separation temperature. This would enable a lower work input requirement and thus higher coefficients of performance. Second, thermally conductive membranes allow for membrane surface condensation. Condensation on these surfaces would form somewhat of a protective layer against surface fouling, which is a major concern regarding longevity in most membranes. Such an approach would be similar to membranes used in desalination arrangements as known to a person having ordinary skill in the art. Third, it presents a simpler system design, allowing it to be more readily available for commercialization. Fourth, it is possible to use the integrated heating/cooling coils to assist in the movement of vapor through the system, thus further lowering the pump work requirement. It should be appreciated that according to one embodiment of the present disclosure the arrangements discussed herein avoid condensation/dehumidification in the air stream. However, given the membrane material are costly to replace, according to one embodiment, paying a small energy penalty to use a small amount of condensation to passively "clean" the membrane to prevent degradation is beneficial. In such a case, the condensation is not for dehumidifying air but is instead just a small amount of condensation to improve membrane life.

Figure 4:
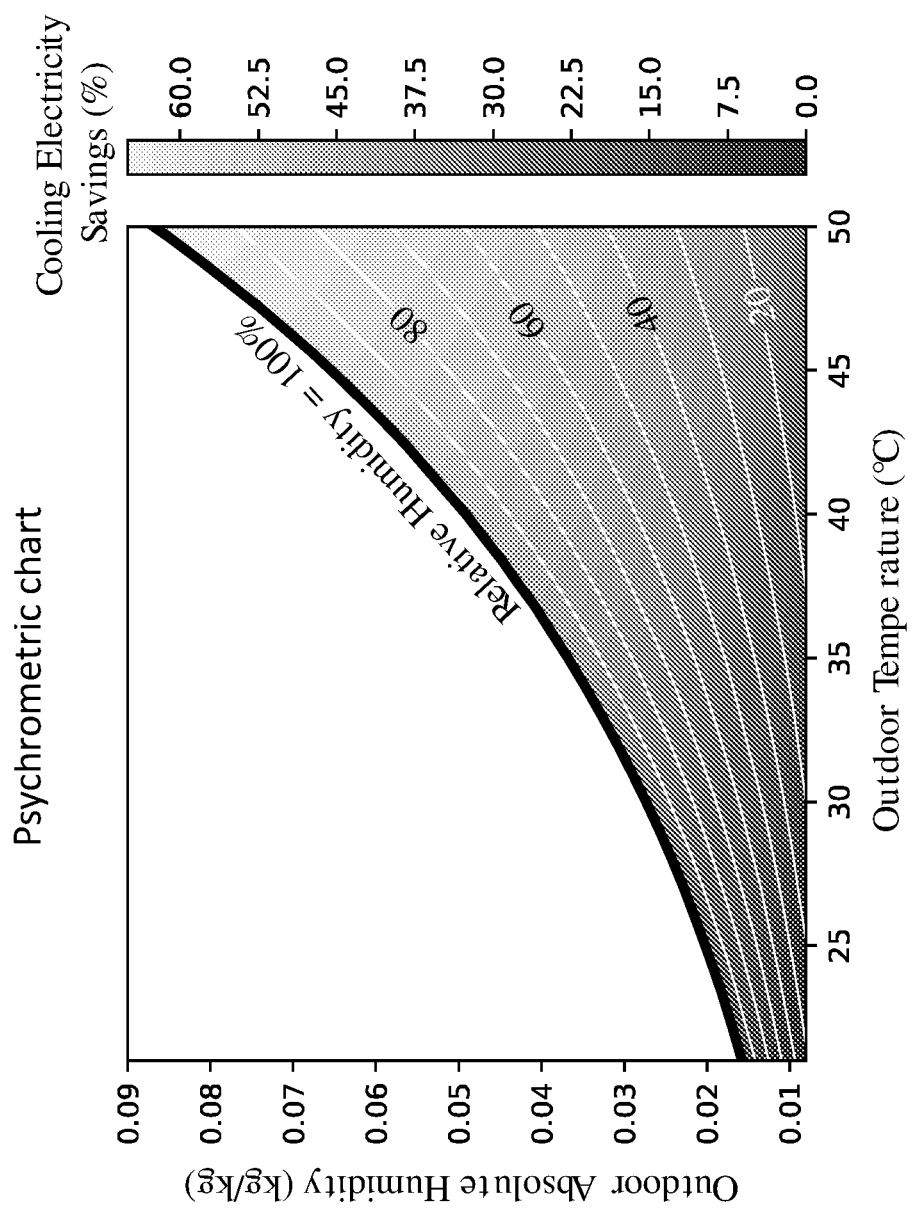
FIG. 4 is the expected energy savings of one embodiment imposed on a psychometric chart providing a graph of the expected energy savings as a function of outdoor absolute humidity (in kg/kg) and outdoor temperature in ° C.

Referring to FIG. 4 a graph of outdoor absolute humidity (in kg/kg) vs. outdoor temperature in ° C. is presented to demonstrate energy savings benefits of the membrane approach of the present disclosure. The electricity savings utilizing the MHX membrane approach of the present disclosure will vary for different configurations and environments, but generally the potential savings range up to 60% in more extreme climates. This graph shown in FIG. 4 is for the embodiment shown in FIG. 9, described further below.

Figure 5:
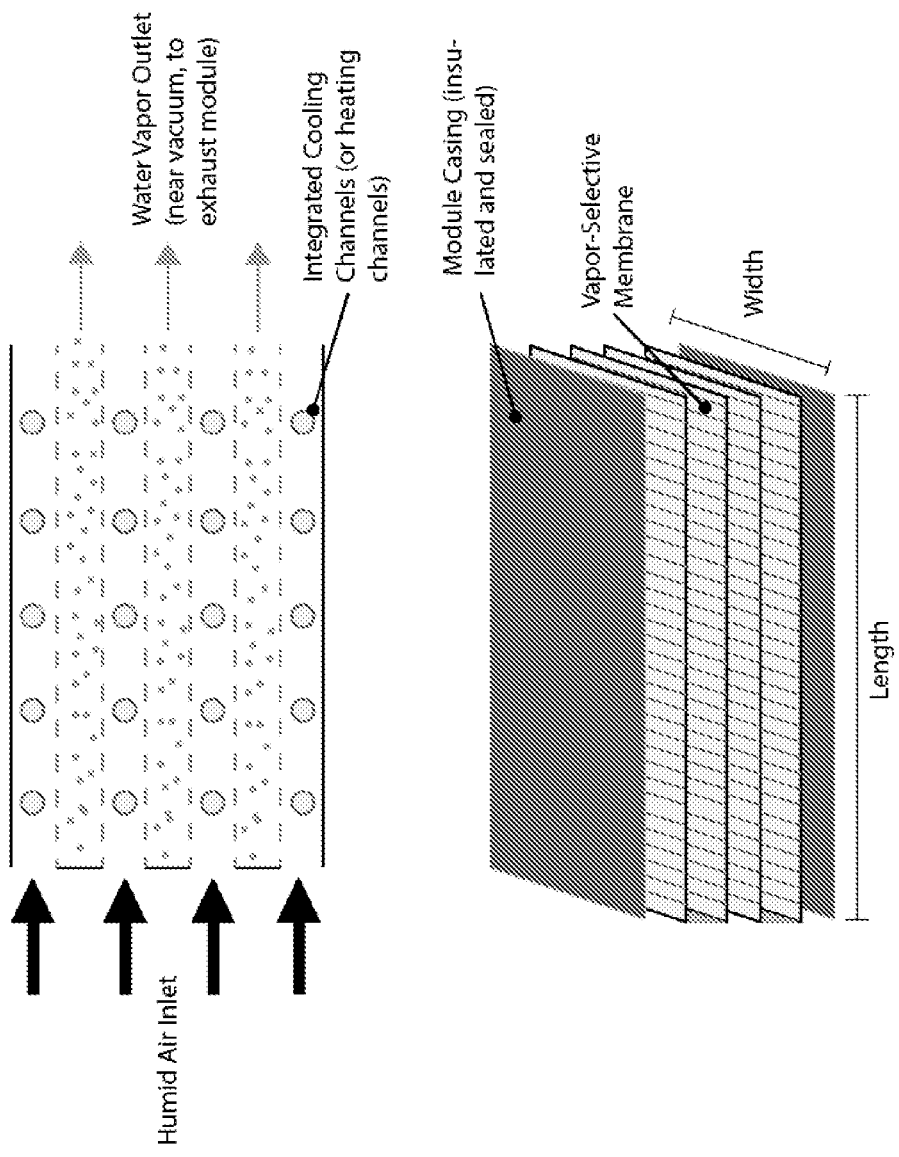
FIG. 5 is a schematic representation of an example of a flat sheet membrane configuration for the membrane-HX system of the present disclosure.

A membrane-HX system that is presented in FIG. 3 is a module-like approach. Such a module could take on many different forms, which are summarized hereunder. First, and simplest, would be a flat plate/sheet membrane module. As the name suggests, this module design would rely on flat membranes. Being the simplest design, this configuration is used in the actual reduction to practice embodiment of the membrane-HX system of the present disclosure. FIG. 5 provides a schematic representation of an example of a flat sheet membrane configuration for the embodiments of the present disclosure. While only a few membrane sheets are shown, it should be appreciated that commercial scale applications may include tens, perhaps hundreds, of membrane sheets in the system.

Figure 6:
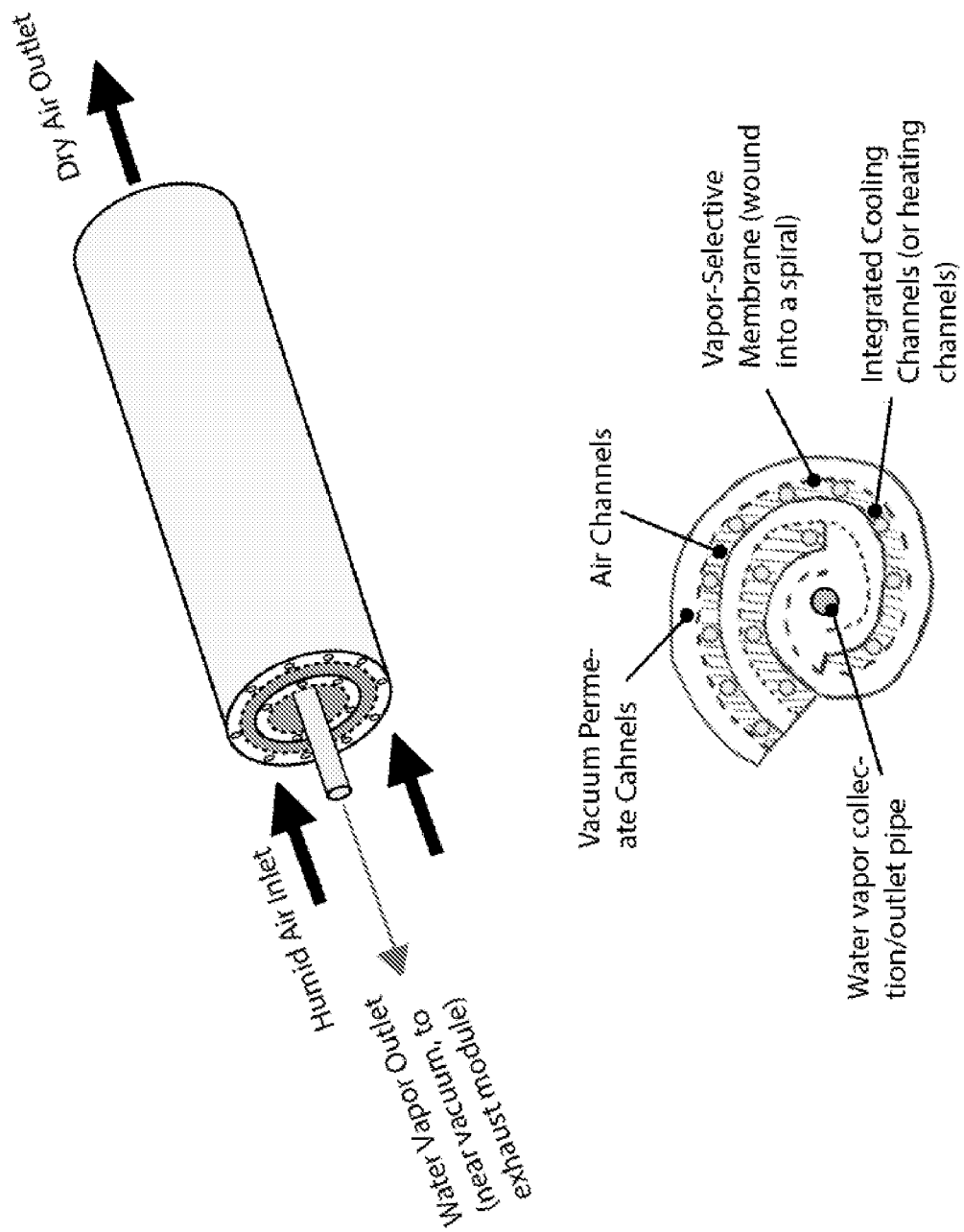
FIG. 6 is an embodiment of a membrane system deployed as a spiral wound membrane, in which a large number of flat sheet membranes are stacked up with spacers in between each membrane, and then rolled up into a compact, cylindrical module.

Another embodiment of the membrane system is a spiral wound membrane, shown in FIG. 6. In this embodiment, a large number of flat sheet membranes are stacked up with spacers in between each membrane, and then rolled the membrane into a compact, cylindrical module. This configuration allows for much greater membrane areas, and thus greater dehumidification capacity, in one small module. In this configuration, the first membrane module would have outdoor air as the feed flow and water vapor permeate out. This water vapor would then enter the permeate channel of the second spiral wound module and permeate into the exhaust air stream being fed to the second module. Such a design would allow substantial dehumidification capacity and small devices but can present challenges in effectively managing the heat transfer desired in the membrane-HX system design.

Figure 7:
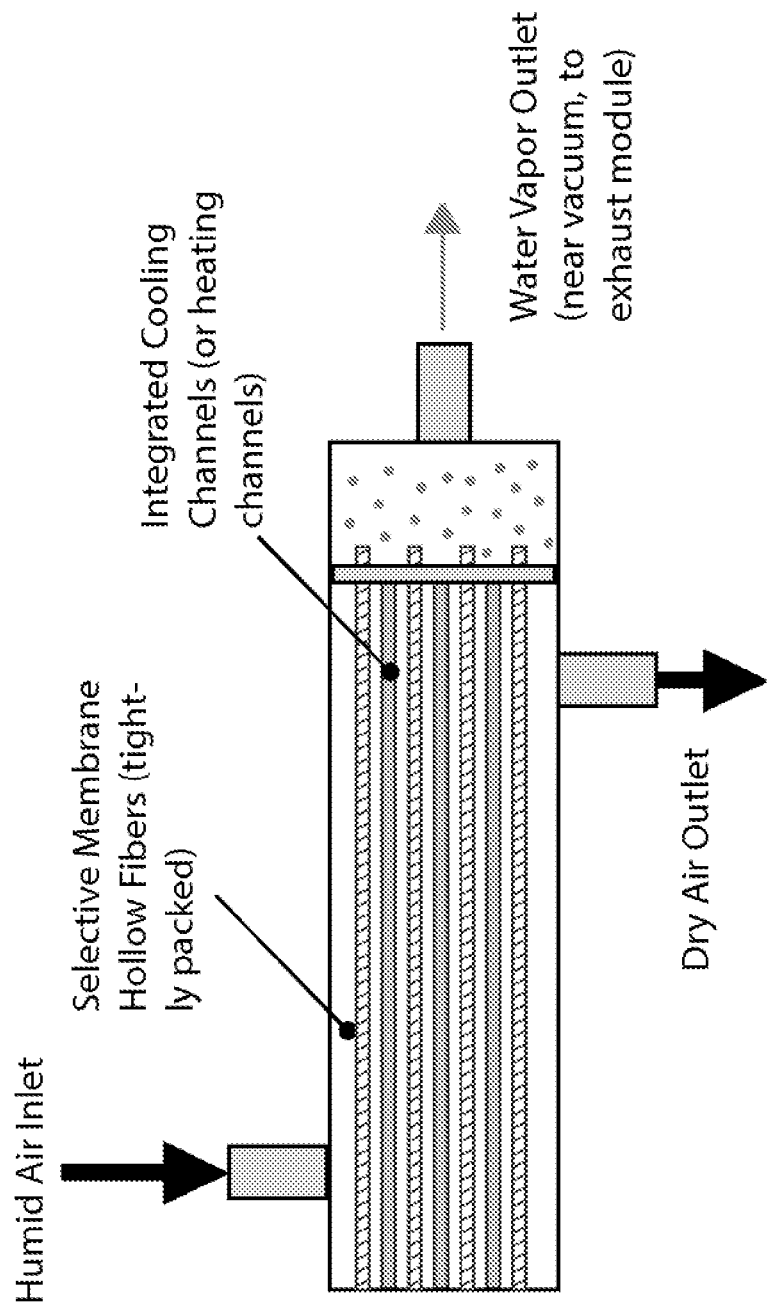
FIG. 7 is another membrane embodiment according to the present disclosure in which a hollow a hollow fiber module is used which allows moist air to enter a shell feed side and leave as the dry product stream.

Yet another membrane embodiment is shown in FIG. 7. This option for membrane module design is a hollow fiber membrane. In this embodiment, the first hollow fiber module would have moist air enter the shell feed side and leave as the dry product stream. Water vapor would permeate into the hollow fibers and leave as the permeate stream. This water vapor would then be fed to the second hollow fiber module in the hollow fiber inlet. Exhaust air would enter the feed gas inlet, vapor would permeate out of the hollow fibers into the exhaust air, and the moist exhaust would leave the shell side outlet. Then, a form of heat exchange pipes in parallel with the hollow fibers are utilized to enable heat exchange between the two modules.

Figure 8:
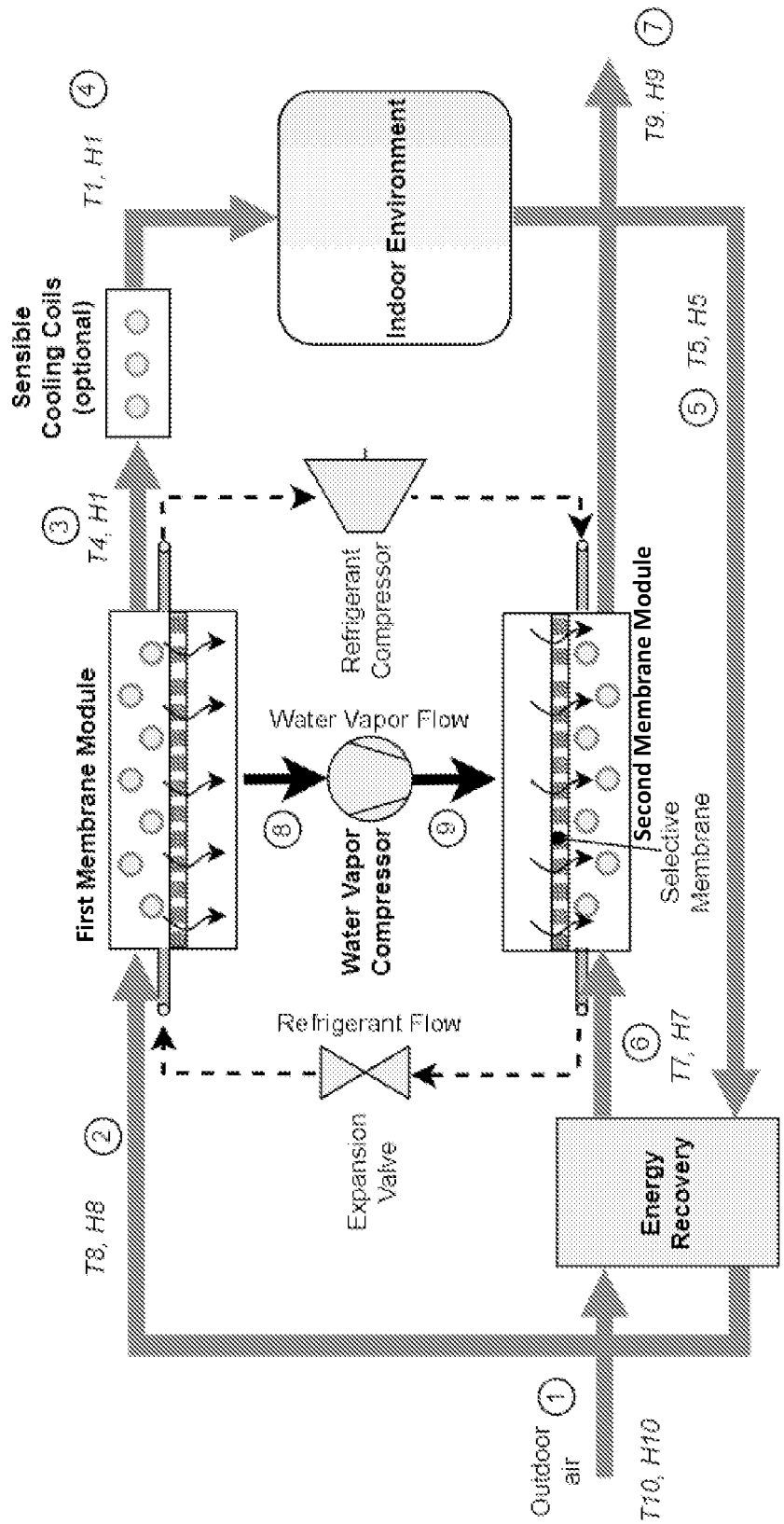
FIG. 8 is a system schematic for a membrane heat exchanger that shows a systems schematic in which the MHX treats 100% outdoor air and uses an energy recovery device to exchange heat and moisture with the outgoing indoor exhaust air.

The general system presented in FIG. 8 is a 100% outdoor air system. That is, the supply air is entirely taken from the outdoor environment, with no air recirculation. However, it is quite common in the HVAC industry to recirculate some of the indoor air, as this allows for increased energy recovery and reduces cooling and dehumidifying loads.

In this embodiment, 100% outdoor air is provided by the MHX system (also known as a dedicated outdoor air system, DOAS). As shown in FIG. 8, outdoor air passes through an energy recovery device, which could either be an energy recovery ventilator, membrane energy recovery ventilator, or a variation of the system shown in FIG. 10 (i.e., any device which transfers both sensible and latent energy between incoming and outgoing air). The energy recovery device assists in passively transferring some of the heat and moisture out of the incoming outdoor air and into the outgoing indoor exhaust air. This partially cooled, partially dried air is then sent to the Membrane Heat Exchanger (shown in the basic embodiment of FIG. 3) for further cooling and dehumidification before low temperature cooling by the sensible coils to achieve the desired supply temperature. This embodiment can advantageously (1) be added on to existing buildings to provide higher rates of outdoor air efficiently or (2) could be used in buildings that require 100% outdoor air capability such as hospitals or laboratories.

Figure 9:
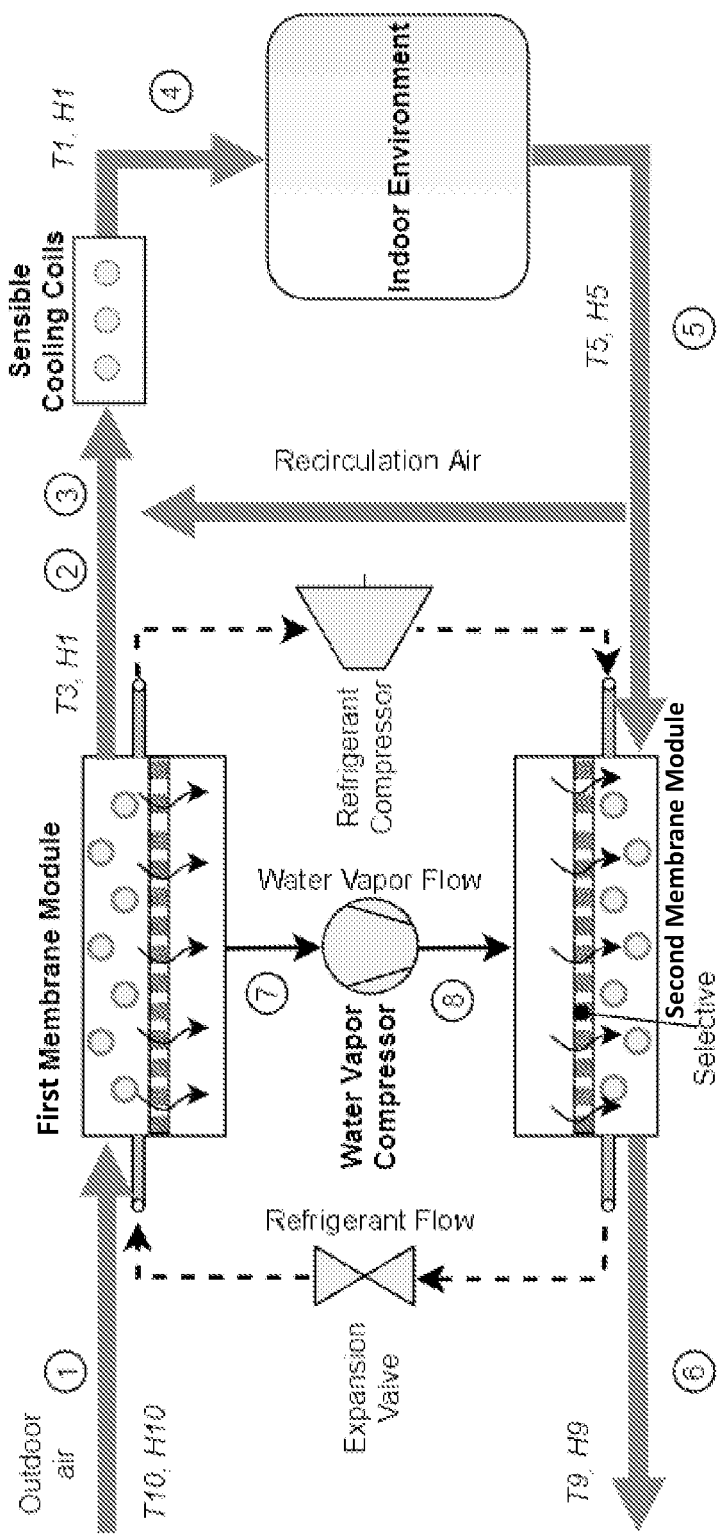
FIG. 9 is a schematic of another embodiment according to the present disclosure which shows how a one membrane-HX system can be used to condition 100% outdoor air and a second cooling coil to cool recirculated air.

A system schematic for a membrane heat exchanger that recirculates some indoor air is shown in FIG. 9. In this configuration, a certain portion of the exhaust air, which is cool and dry, is mixed with outdoor air that has been dehumidified by the membrane-HX so that the mixed stream is at the desired supply humidity level. An active feedback control system is utilized to control how much outdoor air is mixed with the exhaust air. This feedback control system revolves around avoiding condensation, while cooling as much as possible. Therefore, relative humidity sensors are used along with temperature sensors to establish information for a controller to determine how much outdoor air to mix with the exhaust air. The flow rate of coolant in the cooling tubes can also be controlled (e.g., by pumps and valves) as well as the air flow rates (e.g., dampers or fan speed) to control the system so that it maintains cooling while maintaining local conditions above the local dew point based on relative humidity calculations. This adiabatic mixing process causes the air stream entering the membrane module to be cooler and less humid than the outdoor air. Thus, recirculation would lead to lower pump work (less humidity to pull out of the air) and lower cooling coil work inputs, since some of the cooling capacity from the cool exhaust air is recovered by mixing the cool air with warm air (compared to supplying the same amount of air but 100% outdoor). With these lower energy requirements, a higher COP for the system is achievable.

For demonstration purposes, temperature and humidity ratings are provided at various points (1, 2, 3, 4, 5, 6, 7, 8, and 9). The scale of temperature and humidity is between 1 (lowest) and 10 (highest). The relative degree of temperature and humidity at these different points is not to be taken as exact but to effectively demonstrate the change in temperature and humidity at different stages. For example at stage 1 (i.e., outdoor air) the relative humidity and temperature are both 10 (i.e., $T_{10}$ and $H_{10}$). At stage 2, once there has been some cooling and drying as a result of energy recovery with indoor air, the relative humidity and temperature at 8 (i.e., $T_8$ and $H_8$). At stage 3 beyond the first membrane module the temperature is cooled to 4 while the humidity is at a relative 1 (i.e., $T_4$ and $H_1$). At stage 4 once the air is further cooled the temperature and humidity are both at 1 (i.e., $T_1$ and $H_1$). Once the air is introduced to the environment and heated and humidified by equipment (e.g., computers) and human activity (breathing), at stage 5 the temperature and humidity are both at 5 (i.e., $T_5$ and $H_5$). At the output of energy recovery stage, stage 6, the temperature and humidity are both at 7 (i.e., $T_7$ and $H_7$). By mixing the energy recovered air with the air in the second membrane module, the output of this mixing is shown as stage 7 with a relative humidity and temperature of 9 (i.e., $T_9$ and $H_9$).

The approach shown in FIG. 9 is only one embodiment of how recirculation could be used. In addition, one membrane-HX system can be used to condition 100% outdoor air, and a second cooling coil to cool recirculated air. This would have advantages since mixing cool, dry air with warm, moist air could have inherent energy losses. This approach is shown in FIG. 9. As shown in FIG. 9, the membrane-HX unit dehumidifies and cools 100% outdoor air supply, and the mixed air stream (treated outdoor air and recirculation air) is further cooled by the additional cooling coils. Significant energy saving from a recirculation configuration can be achieved, since the membrane-HX still handles the bulk of the energy requirements (dehumidification and cooling of outdoor air), while the second cooling coil will simply need to re-cool the recirculated air a few degrees.

As discussed with reference to FIG. 8, different stages are shown (e.g., 1, 2, 3, 4, 5, and 6) with different relative humidity and temperature values. For example, stage 1 represents outdoor air which represents a relative value of 10 (i.e., $T_{10}$ and $H_{10}$). After the first membrane module the temperature and humidity levels are reduced to 3 and 1 (i.e., $T_3$ and $H_1$), representing dry and cool air. After the recirculation air has been added and the combination is further cooled, stage 4 is at the relative temperature and humidity of 1 (i.e., $T_1$ and $H_1$). Again after warming and humidification associated with the environment, at stage 5 the relative temperature and humidity of 5 (i.e., $T_6$ and $H_5$). At the output of the second membrane module the relative temperature and humidity of 9 (i.e., $T_9$ and $H_9$).

Figure 10:
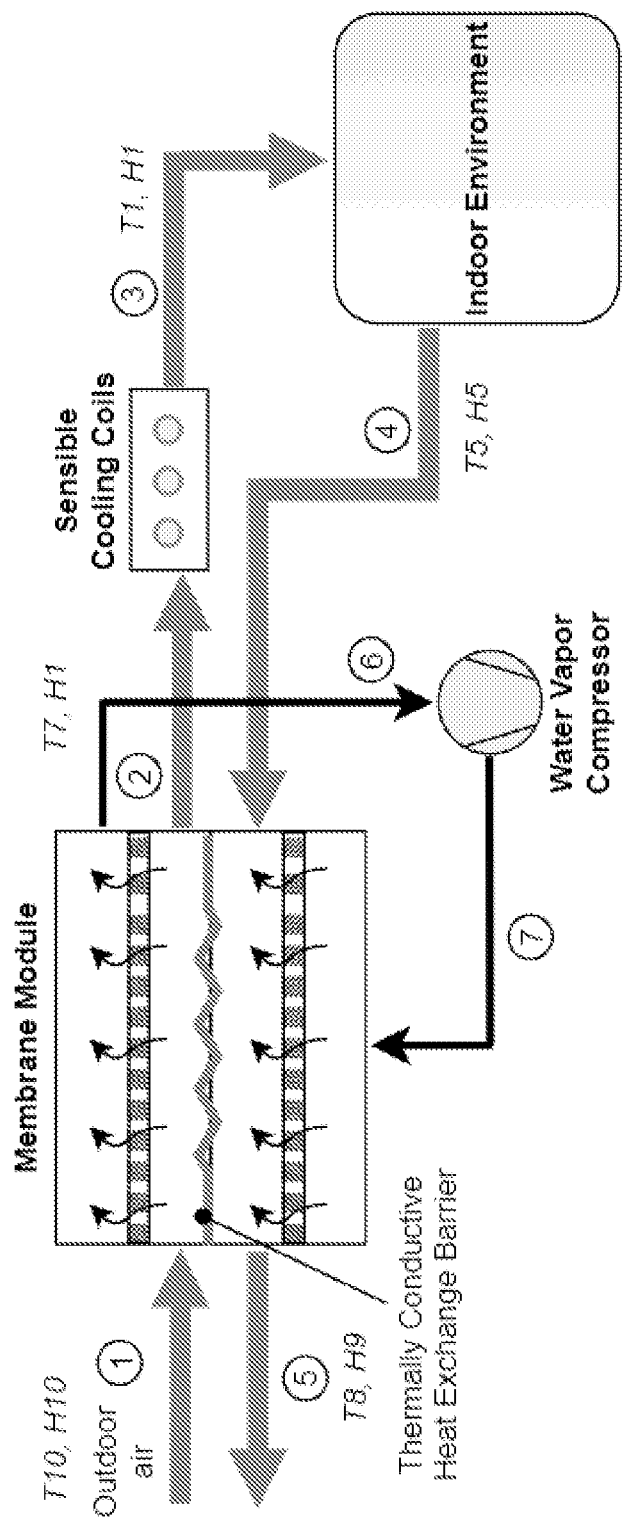
FIG. 10 is the schematic of another embodiment wherein the inlet and outlet air streams are separated by a thermally conductive divider.

In the design shown in FIG. 10, the inlet and outlet air streams are separated by a thermally conductive divider. This design is a departure from the other embodiments which all incorporated active cooling into the air streams via cooling tubes. However, this embodiment instead targets passive heat recovery with active membrane dehumidification. Other existing technologies enable passive heat transfer and dehumidification (known as membrane energy recovery ventilators), however, the passive dehumidification does not provide significant dehumidification and the membrane materials do not transfer substantial heat between air streams. This embodiment of the Membrane Heat Exchanger solves both of these issues. First, by using more traditional heat exchange materials (e.g. copper, aluminum), exceptional heat recovery is enabled between air streams. And, by employing active dehumidification (with a pump/compressor driving the dehumidification), substantial air dehumidification can be achieved. This design still meets the core novelty of the Membrane Heat Exchanger of simultaneous cooling and dehumidification, but enables superior performance compared to existing technologies. Where membrane energy recovery ventilators (M-ERV) rely on passive dehumidification and cooling using relatively non-selective non-conductive materials, the embodiment shown in FIG. 10 uses traditional materials for the thermally conductive heat exchange surface and employs active, pump/compressor driven membrane dehumidification. Thus, this embodiment enables superior high sensible energy recovery and dehumidification as compared to a traditional M-ERV system.

As discussed with reference to FIGS. 8 and 9, FIG. 10 is divided into stages marked as 1, 2, 3, 4, and 5. Relative temperature and humidity is provided for demonstration purposes. At stage 1, i.e., outdoor air is at the relative temperature and humidity of 10 (i.e., $T_{10}$ and $H_{10}$). Stage 2 (output of the membrane module) is at relative temperature and humidity of 7 and 1 (i.e., $T_7$ and $H_1$). After stage 3 (i.e., cooling by cooling coils), the temperature and humidity is at 1 (i.e., $T_1$ and $H_1$). Again after being introduced to the environment, the air heats and humidifies (i.e., stage 5) with a relative temperature and humidity of 5 (i.e., $T_5$ and $H_5$). At stage 5, i.e., the output of the membrane module, the relative temperature and humidity is at 9 (i.e., $T_9$ and $H_9$).

As discussed above, the membrane-HX systems of the present disclosure can occasionally require additional heating in the exhaust stream in order to allow for all water vapor to permeate into the exhaust. In keeping with the goal of integrating heat exchange within the dehumidification process, the heating pipes could still be used to heat the bottom membrane and thus heat the exhaust stream, allowing total vapor flux into the exhaust. In this configuration, the heating pipes would not recover energy, but would simply carry a fluid to and from a heat pump when select heat pumping is required. The most likely design for the heating/cooling pipes is actually to utilize the vapor compression evaporator coils as the cooling pipes (in vapor compression, evaporator coils perform the air cooling) and the condenser coils for the exhaust heating (in the vapor compression cycle, the condenser coilers reject excess heat absorbed in the evaporator). In the membrane-HX design, the integrated cooling cycle provides a key efficiency enhancement to the vapor compression cycle (on top of the substantial efficiency improvements related the membrane dehumidification). As has been previously mentioned herein, the cooling cycle does not need to operate below the air dew point temperature (and should not operate below this temperature), so operating at a warmer cooling temperature than conventional systems marks one enhancement. Second, a typical air conditioning system rejects heat from the condenser to outdoor ambient air, which is generally higher in temperature. But, by including the condenser coils in the exhaust membrane module, the condenser coils instead reject their heat to the indoor exhaust air which is relatively cool. This means the vapor compression cycle uses less energy in rejecting that heat, thus improving the cooling cycle COP. Plus, it is necessary to heat the exhaust air in some environments in order to avoid oversaturation of the exhaust air stream when rejecting the water from dehumidification. Using the vapor compression cycle waste heat to heat the exhaust air negates the need for any separate heating device (saving component space and energy consumption).

The active layer in the membrane-HX systems of the present disclosure is the thin membrane layer that needs to be highly permeable to water vapor, yet highly selective to air ($O_2/N_2$). Membrane materials could vary from polymeric to ceramic, though polymeric membranes are the most widely studied and are generally durable and easier to fabricate. A table listing a few main target materials is included below. Example polymeric materials includes but not limited to include one or more of Pebax 1657/GO, Pebax MV 1074, PVA/TiO2, PVA/LiCl, and PVA/TEG.

TABLE 1

A table comparing membrane characteristics between top candidates for the active layer material

| Membrane Material | Permeance (GPU) | Selectivity |
|---|---|---|
| Pebax 1657/GO | 5,000 | 80,000 |
| Pebax MV 1074 | 8,567 | 200,000 |
| PVA/TiO2 | 1,524 | 5,781 |
| PVA/LiCl | 1,667 | 2,800 |
| PVA/TEG | 4,780 | 3,000 |
| Freestanding GO | 30,150 | >10,000 |

Referring to Table 1, Freestanding Graphene Oxide and the Pebax polymer family emerge as the leading candidates for the active layer material because both exhibit exceptionally high selectivity with high water vapor permeability as well. While the Freestanding GO membrane has far higher permeability, these membranes reported slightly lower permeability and selectivity at higher temperatures (greater than about 40° C.) and can only handle trans-membrane pressure differences of 2 bars. This pressure difference is not an issue for dehumidification applications, but nonetheless, freestanding GO sheets are not nearly as strong as comparable polymeric membranes.

Pebax 1657 and Pebax 1074 exhibit outstanding selectivity, with relatively high water vapor permeance, and are commercially available. So, attaining and implementing them into a membrane would be more streamlined. Additionally, polymeric membranes are generally durable, and a long-lasting material may be of strong interest for commercialization. A membrane as shown herein can achieve a thermal conductivity of between about 1 W/m-K to about 100 W/m-K in one direction, a low tortuosity of between about 1 and about 3, and a strength to withstand at least 1 bar of pressure. The membrane according to the present disclosure may have a porosity of between about 40% to about 70%.

In composite membranes, a support material is incorporated in order to give the membrane higher mechanical strength. Unlike the active layer, the support layer does not need to be selective. A support material that is highly porous, thus adding minimal resistance to the mass transfer process, is desirable since the active layer can serve as the selective barrier. Several primary materials are of most interest which fall into thermally conductive material and structure: graphene foam, silicon carbide, copper foam, aluminum foam, copper mesh, or aluminum mesh. Additionally non-thermally conductive support layers can also be used with some of the embodiments discussed herein which include common porous materials such as porous PAN, PVDF, or PTFE.

Graphene foams are exactly what they sound like—graphene-based material that is fabricated into an extremely porous, low density, foam-like material. Pure graphene has a thermal conductivity of around 4000 (W/m K), which is nearly 10× that of copper. However, graphene foams do not exhibit thermal conductivities this high since they are low density foams, and thus most of their volume is air. However, graphene foams mixed with epoxy can achieve thermal conductivity about 8 (W/m K), which is still 30-40× greater than common polymer materials that might usually be used for membrane support layers. Given graphene foam's exceptional thermal conductivity, which is critical for the membrane heat exchanger, and its remarkably high porosity, it constitutes as the most desirable support layer material.

Silicon carbide provides another potential material for the membrane support layer. Pure silicon carbide has a thermal conductivity of 120 W/m K, and similarly to graphene foams, this value would likely be lower in a support layer application since it would be fabricated into a similar foam/sponge structure.

Copper heat pipes are good candidates, as they are the most conductive and are very common, but Table 2 provides information regarding the thermal conductivity of various common heat transfer materials.

TABLE 2

Summary of thermal conductivity for several common heat transfer materials

| Material | Typical Thermal Conductivity (W/m K) |
|---|---|
| Copper | 400 |
| Aluminum | 236 |
| Stainless Steel | 296 |

Different embodiments for membrane fabrication are presented hereunder. The first option is based on freestanding graphene oxide membranes. The fabrication of freestanding graphene oxide membranes relies on the Hummers method, known to a person having ordinary skill in the art. The Hummers method is a series of chemical treatments that result in the creation of a graphene oxide "slurry," or solution of suspended graphene oxide. Once this slurry is attained, it is spread onto a Teflon plate, dried, and then this thin GO film is carefully removed from the plate using tape. This thin film would then be combined with the thicker support layer to create a "thin film composite membrane."

For the Pebax/Graphene Oxide composite material, "dip coating" is utilized. Essentially, the Pebax polymer can be dissolved in water (around 3 wt % Pebax) and mixed with a solution of suspended graphene oxide (attained using the Hummers method). This mixed solution can be stirred and de-gassed extensively. Then, the support material, which is graphene foam according to the present disclosure, is then stirred and dip it into the Pebax/GO mixture. Around 5 dips and 0.6 wt % graphene oxide produces the most favorable membrane characteristics (high selectivity with relatively high permeability). It should be noted this material incorporates a small weight percentage of graphene oxide into the polymer in order to enhance the selectivity but is an entirely different membrane than the freestanding graphene oxide membrane discussed above.

As for the support layer, as has been discussed above, graphene foam is the material for the support layer due to its high thermal conductivity, porosity, and rapidly increasing interest from countless fields of research. However there can also be other materials suited, as known by a person having ordinary skill in the art. There are different ways for producing graphene foams, but most rely on pre-made foams of different materials (that act as templates), depositing graphene onto those foams, and then decomposing the original foam template, leaving only graphene.

One graphene foam fabrication techniques is "chemical vapor deposition" or CVD. In this fabrication process, nickel foam templates are heated to around 1000° C. and then $CH_4$ is introduced into this extremely hot environment. This leads to the deposition of graphene on the surface of the nickel foam template. Once the foams have cooled, they are dip coated in PMMA to form a protective polymer layer on the graphene surfaces. This PMMA protective surface protects the graphene during the next step in which the foams are submerged into hydrochloric acid to dissolve the nickel foam templates. Once the nickel foam templates are dissolved, the graphene foams are submerged into acetone to remove the PMMA protective coating, leaving behind a freestanding graphene foam.

Yet according to another method a polyurethane foam, similar to those used in household cleaning applications, is dipped into a solution of ethanol and graphene nanoplatelets. The foam is dried and repeatedly dipped in this solution to deposit graphene onto the surface of the PU foam. Once it has been dipped and dried several times, the PU foam, which has acted as a foam template, is decomposed through induction heating, leaving behind a freestanding graphene foam.

As discussed above, the membrane-HX systems includes modules. Module dimensions vary based on the amount of air being supplied to the indoor environment—larger volumes of supply air can require more water vapor flux and thus larger membrane areas. Table 3 summarizes the general dimensions that are targeted, according to one embodiment.

TABLE 3

Dimensions of a module of the membrane-HX system according to one embodiment designed for testing

| | [Commercial] (Actual reduction to practice) Dimensions |
|---|---|
| Width | [about 0.7 m to about 2.5 m] (about 10 cm) |
| Length | [about 0.7 m to about 7 m] (20 cm) |
| Height | [about 1 to about 2 m] (20 cm) |
| Air/Vapor Channel Thickness | about 1 to about 6 mm |
| Thickness (Active layer) | about 30 nm to about 100 μm, or about 30 nm to about 1 μm |
| Thickness (Support layer) | about 30 um to about 200 μm |

However, membrane areas on the order to 100 $m^2$ may be required to sufficiently dehumidify air for buildings or other applications. Achieving such high membrane surface areas is done by spacing hundreds of membrane layers very close together, leaving small channels between each of the individual membrane sheets for feed and permeate flows.

Figure 11:
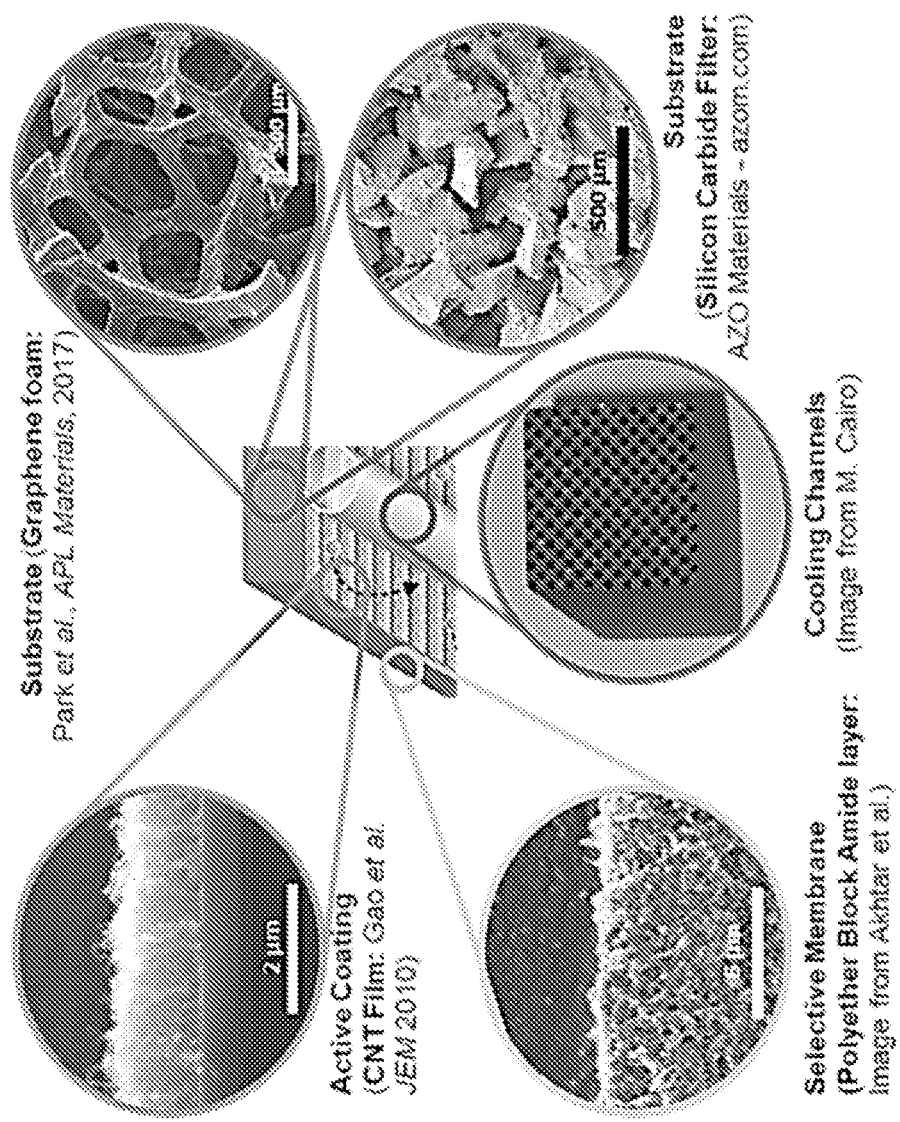
FIG. 11 is a collection of photographs which shows and summarizes enlarged structures of the material selection information and carbon nanotubes (CNT) enhancement as a choice of material for the membrane.

Enhancement of membrane surface characteristics via the use of nanomaterials is of particular interest with respect to the membrane-HX system according to present disclosure. Water vapor condensation on the surface may lead to improved surface fouling resistance. Surface fouling is the process by which particles collect and block the pores of a membrane, thus reducing the membrane permeability. So, preventing fouling, can lead to longer lasting membranes with higher performance. Two factors help induce condensation on the membrane surfaces: thermal conductivity and surface hydrophobicity. Thermal conductivity allows the vapor to be cooled at the membrane surface, thus inducing condensation and can be achieved using graphene foam support layers. Hydrophobicity can be increased using carbon nanotube (CNT) coatings. FIG. 11 summarizes the material selection information and the above-discussed CNT enhancement.

Figure 12:
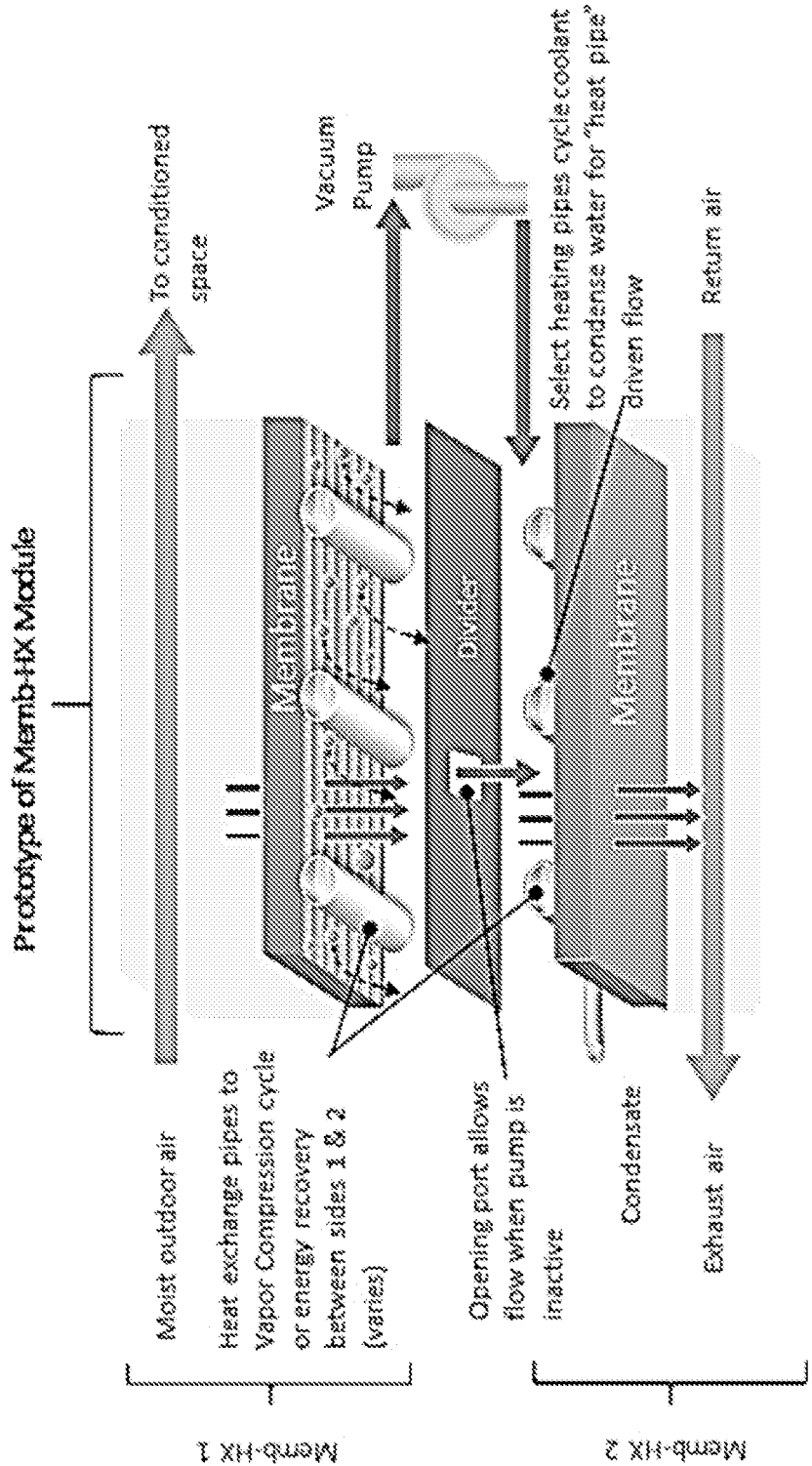
FIG. 12 is a detailed schematic of the membrane-HX system according to present disclosure.

A detailed depiction of the membrane-HX system according to present disclosure is presented in FIG. 12. The heating/cooling pipes in both modules provide more control over the temperatures in each module. FIG. 12 presents the Membrane-HX system according to the present disclosure with a vacuum pump, and connections to full HVAC system. Sensors for T, H, m, and P are located on inlets and outlets of air channels and heat exchange pipes, before and after vacuum pump. T and m are measured for condensate. As can be seen, moist air enters in the top left. A vacuum pump creates a vacuum pressure in the first module, pulling water vapor through the membrane. This water vapor is then pumped to a slightly higher pressure in the second membrane module, thus forcing the water vapor into the exhaust stream. Meanwhile, the heat exchange pipes are cooling the supply air and heating the exhaust air when required.

Figure 13:
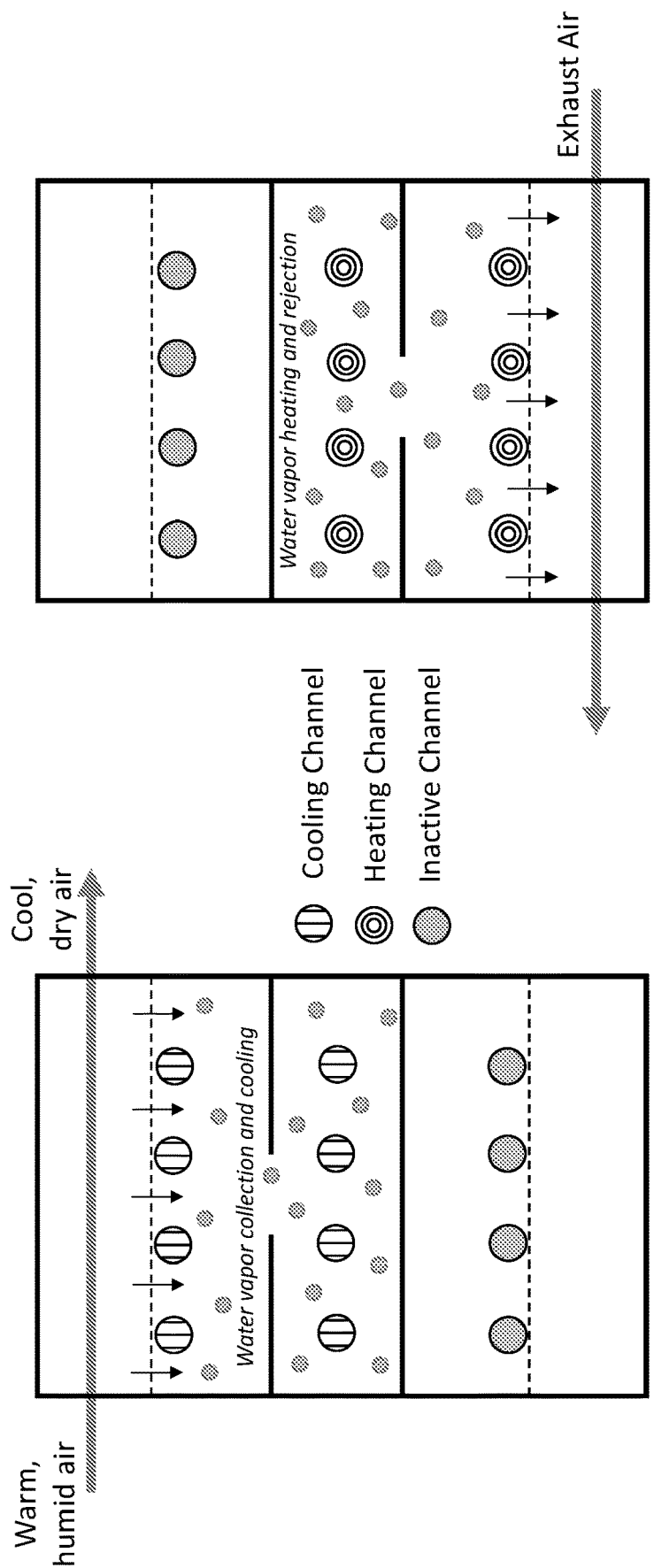
FIG. 13a is a schematic showing 3 parts of a process according to the present disclosure including the build-up of water vapor molecules in a top membrane module while the cooling coils continue to cool the vapor to maintain low vapor pressure to continue the dehumidification process.
FIG. 13b is a schematic similar to that which is shown in FIG. 13a where the chamber in which water vapor was collecting is now exposed to the bottom membrane module via the switching of opening ports. The water vapor is heated to raise the vapor pressure and expel the vapor through the membrane into an exhaust air stream.
Figure 14:
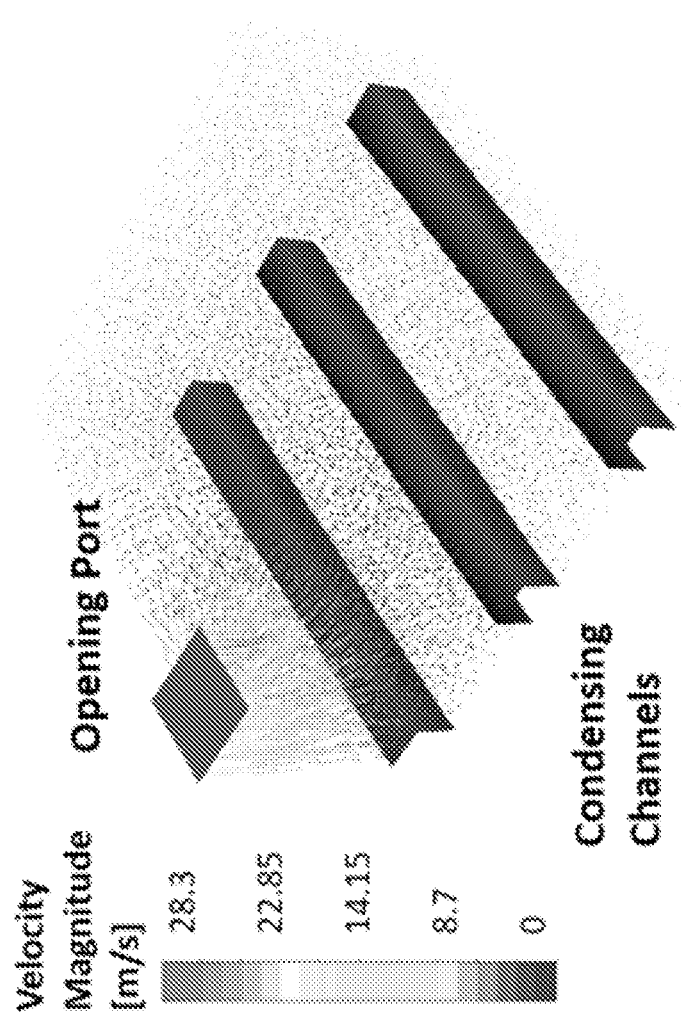
FIG. 14 is the result of a computational fluid dynamics (CFD) analysis according to the present disclosure.

FIG. 13a is a schematic showing 3 parts of a process according to the present disclosure including the build-up of water vapor molecules in a top membrane module while the cooling coils continue to cool the vapor to maintain low vapor pressure to continue the dehumidification process. This correlates to the heat pipe effect due to heat pipes also being driven by a pressure difference in hot vapor and condensing vapor. FIG. 13b is a schematic similar to that which is shown in FIG. 13a where the chamber in which water vapor was collecting is not exposed to the bottom membrane module via the switching of opening ports. The water vapor is heated to raise the vapor pressure and expel the vapor through the membrane into an exhaust air stream FIG. 14 displays a computational fluid dynamics (CFD) analysis according to the teachings of the present disclosure. This CFD displays the vapor flowing from the top membrane module to the bottom membrane module without a pump. Part c in FIG. 13a is the last part of the process. At this point, the port in the divider has been closed again, and the water vapor inside the bottom membrane module is heated using the heat pipes to increase the vapor pressure and force the vapor into the exhaust stream. All of this vapor movement occurs without the pump, thus constituting a potential for energy savings.

FIG. 13a and FIG. 13b depict two parts of the same process. FIG. 13a is the first part which directly leads into the process of FIG. 13b. Here in FIG. 13a the membrane heat exchanger is cooling and dehumidifying the intake air. However, instead of using a vacuum compressor to create the pressure difference across the membrane, instead cooling coils are used from the vapor compression cycle to cool the vapor in the vacuum chamber. Cooling the vapor in this chamber lead to a lower vapor pressure and some condensation, thus leading to a comparable driving force. Once vapor pressure of the intermediate chamber approaches the vapor pressure in the air channel, the intermediate chamber switches openings, as shown in FIG. 13b, and then a heat pump heats the vapor that has just been collected in the cooling process. Heating this vapor raises its pressure, thus forcing it across the bottom membrane in the same way the vacuum compressor did. In this operation mode, the exhaust sweep stream would simply be ambient/outdoor air. Any condensed water could be removed with a liquid pump, adding minimal work input to the system.

Figure 15A:
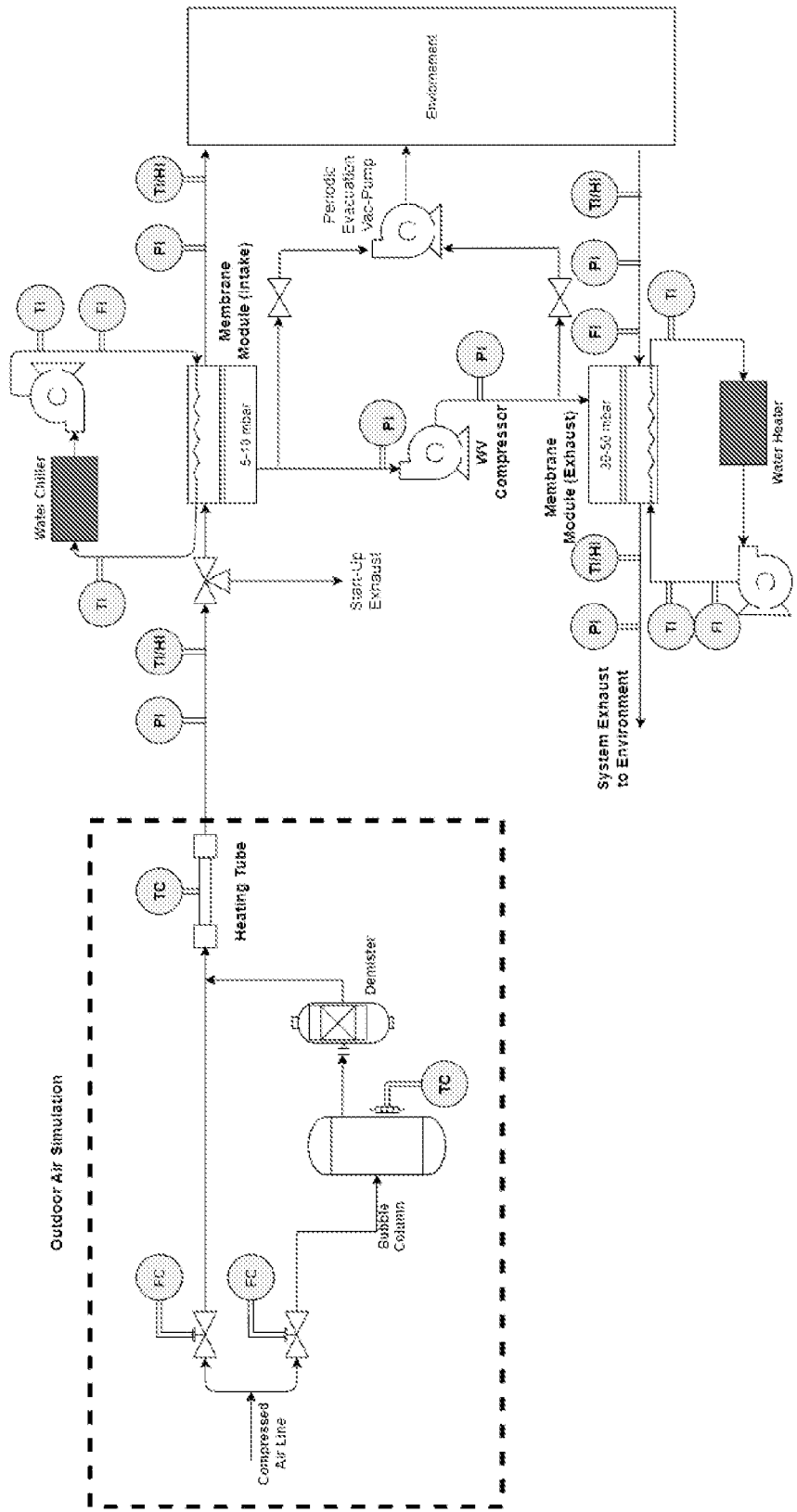
FIG. 15a is a detailed schematic summarizing the equipment that can be used for testing the Membrane-HX system according to the present disclosure.

A detailed schematic summarizing the equipment that can be used for testing the Membrane-HX system according to the present disclosure is shown in FIG. 15a. Here, inlet air (which is simulated outdoor air), enters the device since the air line in the lab is pressurized. This outdoor temperature and humidity will be simulated either via a controlled evaporating mixer of by use of a bubble column. The temperature, pressure, flowrate, and humidity of the warm, moist air can be measured, emulating outdoor air conditions.

All the properties can be measured immediately after the membrane module in order to evaluate the dehumidification and heat exchange performance of the membrane module. Indoor air will be pulled from the lab space to emulate the indoor air of a building. This air then goes to the second membrane module, accepts the exhaust vapor stream, and temperature, flow, and humidity are measured.

The cooling and heating tubes (emulating evaporator coils and condenser coils, respectively), will carry water to maintain the desired coil temperature, instead of designing a vapor compression cycle for the first prototype. For the cooling tubes in the intake membrane module, the water will be supplied by a recirculating chiller, and the water in the heating tubes will be supplier by a recirculating heater. Both of these recirculating arrangements can control flowrates and temperatures. Temperatures will be chosen to best emulate the operating temperatures of evaporator and condenser coils in a conventional vapor compression cycle.

Figure 15B:
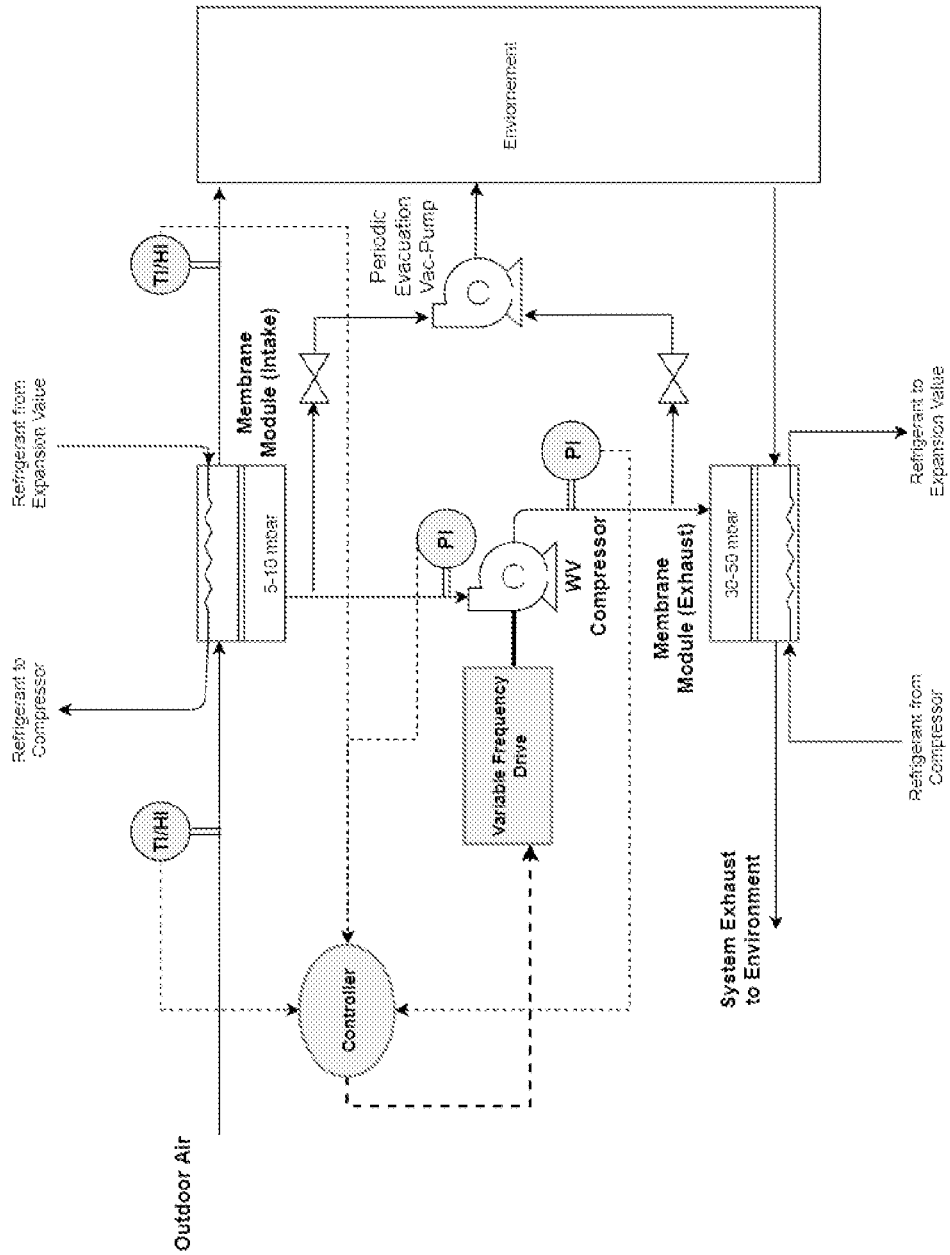
FIG. 15b is a detailed schematic summarizing the equipment that can be used for an industrial application using the Membrane-HX system according to the present disclosure.

Insofar as controlling the operation of the system shown in FIGS. 15a and 15b, temperature can be measured throughout the system using thermometers (e.g., digital). The mass flowrate can be measured using mass flowmeters. Humidity can be measured using hygrometers, and pressure can be measured using pressure gauges or pressure transducers.

A detailed schematic summarizing the equipment that can be used for an industrial application using the Membrane-HX system according to the present disclosure is shown in FIG. 15b. In this industrial application embodiment, the fan flowrate would be set by the manufacturer's recommendation, however much air is required for different types of indoor spaces. For the system discussed above (the embodiment shown in FIG. 15a), the air flow setting can be set to constant, but needs to be carefully picked flowrates that can reasonably be dehumidified by a membrane-HX system, which may be significantly smaller than a commercial air conditioning system.

The outdoor air simulation components may be avoided in a commercial membrane-HX since its only purpose is to simulate differing outdoor air temperatures. So, for the purposes of the present disclosure, this part of the system can be varied from approximately 24° C. to 50° C., and these temperatures can simply be set by the user.

Based on the simulated outdoor air conditions and the user set indoor conditions (e.g., 24° C., 50% relative humidity), the amount of vapor that is needed to pull out of the air stream can be calculated. This amount of vapor that must be removed is known as flux, or J. Given a constant membrane area, required flux, membrane permeability, a constant pump ratio (PR), and assuming that only water vapor passes through membrane, the required pump pressures can be calculated with the equations below:

$$J = \text{Permeability} * \text{Area} * (P_{vap\ high} - P_{vac\ low})$$

$$P_{vac\ high} = (PR) * P_{vac\ low}$$

FIG. 15b shows the basic instrumentation that could be included on a commercial application. Far less measurements are required for non-experimental applications. Namely, the temperature and humidity of the outdoor air, the two pressures associated with dehumidification and vapor rejection (either side of the compressor) and the temperature and humidity after the intake membrane module are measured. These values can then be fed to a controller to vary the operation of the compressor. For example, if the inlet temperature and humidity are both high (tropical climate), the controller will increase the dehumidification rate by increasing the compression rate via the variable frequency drive. The controller can choose this setting based on extensive performance mapping from research and development experiments. The two pressure measurements can monitor the pressure in these two vacuum chambers to ensure proper operation. The temperature/humidity measurement downstream from the MHX module can double check that proper cooling and dehumidification is occurring and can help the controller correct for abnormal operation that does not follow the expected performance mapping.

Given the dehumidification process relies on low pressures, the strong materials need to be selected for the module container. The container can be made out of steel or aluminum plate metal and can be designed in several pieces that bolt together so one can easily replace membranes and access internal equipment like the cooling/heating coils or property measurement probes. Additionally, since the heat transfer component is equally important in this process, care must be taken to prevent heat loss to the surroundings. This a commercially available insulating foam can be applied to the exterior of the module. The membranes and their supports must also be able to sustain exposure to large pressure gradients (near 1 atmosphere) for long periods of time.

Those having ordinary skill in the art will recognize that numerous modifications can be made to the specific implementations described above. The implementations should not be limited to the particular limitations described. Other implementations may be possible.

The invention claimed is:

1. A heat exchange system, comprising:
an air inlet,
a membrane in fluid communication with the air inlet and adapted to have a partial vapor pressure difference across the membrane to thereby drive water vapor flux through the membrane, wherein the membrane is a selective membrane configured to allow passage of water vapor and block passage of air ($O_2/N_2$) through the membrane, where the membrane includes a thermally conductive side,
a vacuum pump configured to generate the partial vapor pressure difference across the membrane, and
a heat exchanger coupled to the thermally conductive side of the membrane configured to provide simultaneous mass and heat transfer,
wherein the membrane includes an active layer and a support layer, and
wherein the support layer includes a graphene foam layer.

2. The heat exchange system of claim 1, wherein the support layer includes one or more of copper foam, aluminum foam, copper mesh, and aluminum mesh.

3. The heat exchange system of claim 1, wherein the active layer includes a polymeric material.

4. The heat exchange system of claim 3, wherein the polymeric material includes one or more of Pebax 1657/GO, Pebax MV 1074, PVA/TiO2, PVA/LiCl, and PVA/TEG.

5. The heat exchange system of claim 1, wherein the support layer includes a ceramic material.

6. The heat exchange system of claim 5, wherein the ceramic material includes silicon carbide.

7. An air conditioning system, comprising:
a vapor-selective membrane adapted to have a partial vapor pressure difference across the membrane to thereby drive water vapor flux through the membrane, wherein the membrane is a selective membrane configured to allow passage of water vapor and block passage of air (O2/N2) through the membrane;
a vacuum compressor adapted to provide dehumidification and vapor compression, and cooling coils incorporated into the vapor-selective membrane to thereby allow simultaneous cooling and dehumidification,
wherein the vapor-selective membrane includes an active layer and a support layer, and
wherein the support layer includes a graphene foam layer.

8. The air conditioning system of claim 7, wherein the support layer includes one or more of copper foam, aluminum foam, copper mesh, and aluminum mesh.

9. The air conditioning system of claim 7, wherein the active layer includes a polymeric material.

10. The air conditioning system of claim 9, wherein the polymeric material polymeric material includes one or more of Pebax 1657/GO, Pebax MV 1074, PVA/TiO2, PVA/LiCl, and PVA/TEG.

11. The air conditioning system of claim 7, wherein the support layer includes a ceramic material.

12. The air conditioning system of claim 11, wherein the ceramic material includes silicon carbide.

13. An air conditioning system, comprising:
a first membrane module, including
an inlet and an outlet,
at least one vapor-selective membrane, and
a first plurality of cooling coils coupled to the at least one vapor selective membrane of the first membrane module,
wherein the first membrane module defines a first vacuum zone;
a second membrane module, including
an inlet and an outlet,
at least one vapor-selective membrane, and
a second plurality of heating coils coupled to the at least one vapor selective membrane of the second membrane module,
wherein the second membrane module defines a second vacuum zone;
an air inlet adapted to introduce outdoor air into the inlet of the first membrane module;
a primary vacuum pump adapted to initially reduce pressure in the first and the second vacuum zones to a predetermined pressure or below; and
an outlet coupled to the outlet of the second module and adapted to output air to the outdoor air,
wherein the pressure in the first vacuum zone is modulated based on water vapor partial pressure in air passing through the inlet of the first membrane module and the pressure in the second vacuum zone is modulated based on water vapor partial pressure in air passing through the inlet of the second membrane module, whereby the pressure in the second vacuum zone is maintained at a higher pressure than the pressure in the first vacuum zone,
wherein the at least one vapor-selective membrane of the first and the second membrane modules includes an active layer and a support layer, and
wherein the support layer includes a graphene foam layer.

14. The air conditioning system of claim 13, wherein the support layer includes one or more of copper foam, aluminum foam, copper mesh, and aluminum mesh.

15. The air conditioning system of claim 13, further comprising a first divider disposed between the first membrane module and the second membrane module, wherein the pressure modulation in the first and the second vacuum zones is accomplished by thermal gradients across the first divider through a first valve.

16. The air conditioning system of claim 15, further comprising a second divider having a second valve disposed between the first divider and the second membrane module, thereby generating an accumulator zone between the first divider and the second divider, whereby the first valve and the second valve are selectively operated when a predetermined amount of water vapor is accumulated in the accumulator zone to thereby release the water vapor to the second membrane module.

* * * * *